Aug. 4, 1931.   E. R. YOUNG   1,817,220
VEHICLE
Filed May 10, 1930
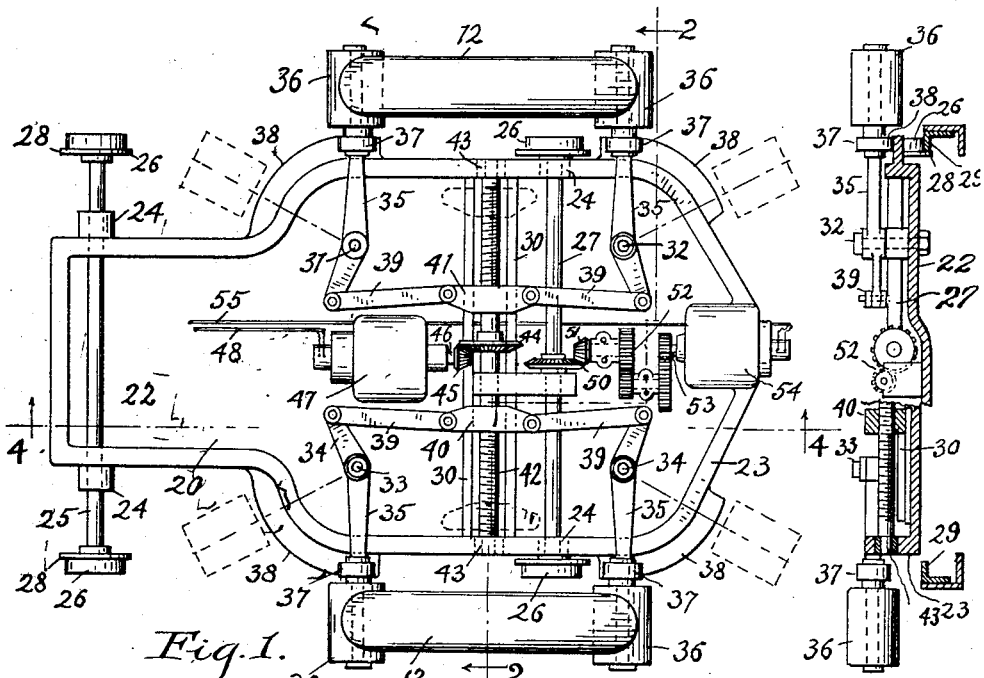
Fig. 1.
Fig. 2.
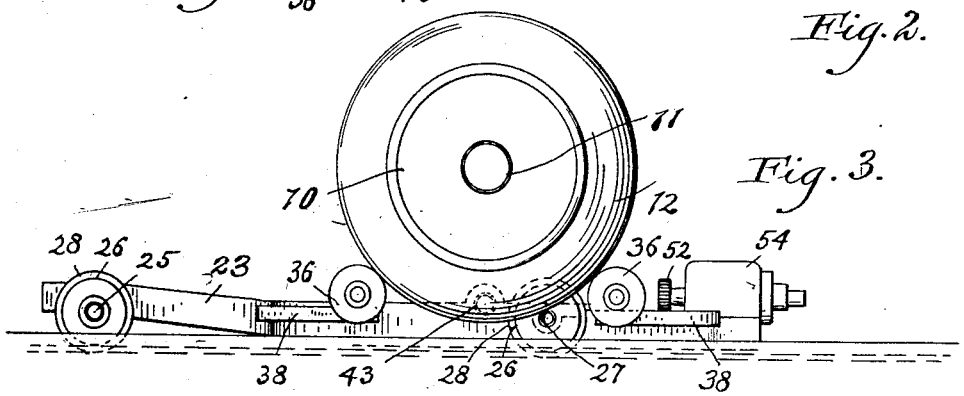
Fig. 3.
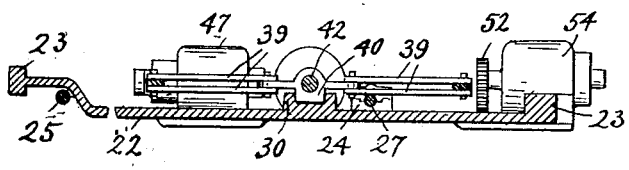
Fig. 4.
Inventor
Elkins R. Young
Kerr Hudson & Kent
attys.

Patented Aug. 4, 1931

1,817,220

UNITED STATES PATENT OFFICE

ELKINS R. YOUNG, OF CLEVELAND HEIGHTS, OHIO

VEHICLE

Application filed May 10, 1930. Serial No. 451,215.

This invention relates to vehicles, and more particularly to a device of this character in the nature of a truck, which is adapted to be moved under a vehicle, such as an automobile, so as to move the same by external power.

The device according to the present invention is particularly suitable for manipulation of automobiles in a parking garage, but, of course, the same is not limited thereto as it is equally applicable to all manner of elevating and shifting large vehicles by means of a small truck or dolly.

It is an object of the present invention to provide a self-propelled truck or dolly adapted to be moved under a vehicle and elevate one end thereof so as to support the vehicle for convenient movement by a source of external power.

It is another object of the invention to provide a device of this character having power propelling means adapted for remote control.

It is another object of the invention to provide a device of the character described in which the means for elevating the vehicle are adapted to engage the tires thereof, to provide a steady support therefor, and also to avoid marring of the vehicle.

Another object of the invention is to provide a device of the character described which will be simple and efficient in construction and operation, substantially foolproof, not likely to get out of order, and otherwise well adapted for the purposes set forth.

Other objects and features of novelty will be apparent from the following description as taken in conjunction with the accompanying drawings, in which:

Fig. 1 is a plan view of a truck according to the preferred embodiment of the present invention;

Fig. 2 is a cross-section taken along the line 2—2 of Fig. 1;

Fig. 3 is an elevation of the structure shown in Fig. 1; and

Fig. 4 is a section taken along the line 4—4 of Fig. 1.

Referring more particularly to the drawings, a wheel of the vehicle, such as an automobile, is indicated diagrammatically at 10 as comprising the customary hub 11 and pneumatic tire 12.

The truck or dolly, according to the present invention, is indicated generally at 20, and comprises a frame which consists essentially of a comparatively flat floor plate 22 and a reenforcing marginal flange 23. Carried by the frame 21 are a plurality of bearings 24. One pair of these bearings receive an axle 25 carrying wheels 26, and another pair of the bearings 24 receive another axle 27 carrying similar wheels 26. The bearings 24 are rigidly mounted in the frame so that the axles 25 and 27 are parallel.

In the form shown, the wheels 26 are provided with flanges 28 so that the wheels may move along angle tracks 29, and the flanges 28 will serve to retain the wheels thereon. The flanges 28 may be omitted when the vehicle 10 is intended to run on a flat surface such as an ordinary floor.

Mechanism is provided for raising the adjacent wheels of the vehicle from engagement with their support, so that the vehicle may be moved by the truck. In the form shown, four rigid vertical pivots 31, 32, 33 and 34 are mounted on the frame 20 and symmetrically spaced with respect thereto. Each of these pivots supports a lever 35 which projects beyond the flange 23 and outside of the vehicle. Lifting elements, such as wheel engaging rollers 36, are provided on the projecting ends of the levers. The levers also carry supporting rollers 37, located in position to engage supporting ledges or tracks 38 carried by the vehicle frame adjacent each of the pivots 31, 32, 33 and 34.

The inner ends of each pair of levers are connected by toggle mechanism including links 39. The links 39 for the levers of the pivots 33 and 34 are connected to the opposite sides of a nut 40, while the links 39 for the levers of the pivots 31 and 32 are correspondingly connected to the sides of a nut 41. The nuts 40 and 41 are respectively threaded on the ends of a screw 42 journaled in bearings 43 carried by the flange 23. The threads on the screw are oppositely disposed, so that rotation of the shaft will cause the nuts 40 and 41 to move together or to be moved apart with the same speed. The nuts are prevented from rotation by guides 30 along which the nuts slide when the screw 42 is rotated.

Keyed to the mid portion of the shaft 42 is a bevel gear 44 meshing with a bevel pinion 45 carried by the shaft 46 of a motor 47. Power is supplied to the motor 47 by means of a cable 48 which may extend to a remote control switch.

For propelling the truck 20 with the vehicle wheels 12 carried thereby, the shaft 27 is provided with a bevel gear 50 meshing with a bevel pinion 51 which receives power through transmission gearing indicated generally at 52, from the shaft 53 of a motor 54. The motor 54 is supplied with power by means of a cable 55 which may extend to a remote control switch.

When the truck is not in use the rollers 36 will normally be arranged in the dotted line position shown in Fig. 1. In this position they will clear the wheels 13 so that the truck 20 may be moved under the vehicle. The truck need not be accurately positioned so long as the rollers 36 are on the opposite sides of the tire to be engaged. When current is supplied to the motor 47 it will rotate the screw 42 and draw the nuts 40 and 41 inwardly. This action will cause the rollers 36 to swing from the dotted line position to the position shown in full lines. The drawing together of the rollers 36 will of itself cause a centering of the same with respect to the tire 13. It will be obvious from an inspection of Fig. 3 that the inward movement of the rollers 36 forces the tire 13 upwardly, thus elevating the corresponding end of the vehicle. It should be noted that the device is automatically retained in the elevated position, as the nuts 40 and 41 will prevent movement of the toggles, and no other locking mechanism is necessary. Power may then be supplied to the motor 54 and rotate the driving axle 27 so as to propel the truck. Obviously, reversal of the motor will reverse the direction of propulsion.

While the preferred embodiment of the invention has been illustrated and described in such detail as to enable any one skilled in the art to practice the invention, it is to be understood that the same is not to be limited to any of the details disclosed, other than as necessitated by the development of the prior art, but, instead, includes such embodiments of the broad idea as fall within the scope of the appended claims, it being obvious that various changes may be resorted to without departing from the spirit of the invention.

Having thus described my invention, I claim:

1. In combination with a truck adapted to be positioned under a vehicle, two pairs of lifting elements carried by said truck, each pair of elements being adapted to engage one wheel of said vehicle, and means for moving said lifting elements to thereby elevate said wheels.

2. In combination with a truck adapted to be positioned under a vehicle, rollers carried by said truck and mounted for movement from positions clear of the path of the wheels of said vehicle to positions in engagement with said wheels, and means for moving said rollers to thereby elevate said wheels.

3. In combination with a truck adapted to be positioned under a vehicle, rollers carried by said truck and adapted to engage wheels of said vehicle below the hubs thereof, and means for relatively moving said rollers toward each other horizontally to cam said wheels upward.

4. In combination with a truck adapted to be positioned under a vehicle, a pair of lifting elements carried by said truck and adapted to engage the periphery of a wheel of said vehicle, and means for moving said lifting elements to elevate said wheel.

5. A device of the character described, comprising in combination, a frame, wheels supporting said frame, a pair of levers pivoted on said frame in a horizontal position, rollers mounted on said levers, and toggle mechanism for operating said levers to move said rollers toward and away from each other.

6. In a device of the character described, in combination, a frame, wheels supporting said frame, levers pivoted on said frame and projecting laterally therefrom, lifting elements carried by said levers, and means for swinging said levers toward each other in a substantially horizontal plane.

7. In a device of the character described, in combination, a frame, wheels supporting said frame, levers pivoted on said frame and projecting laterally therefrom, lifting elements carried by said levers, a screw journaled in said frame, and means for simultaneously operating all of said levers from said screw.

8. In a device of the character described, in combination, a frame, wheels supporting said frame, levers pivoted on said frame and projecting laterally therefrom, lifting elements carried by said levers, means for operating said levers, tracks on said frame adjacent the path of said levers, and means carried by said levers and engaging said tracks for supporting said levers therefrom.

9. In a device of the character described, in combination, a frame, wheels supporting said frame, levers pivoted on said frame and projecting laterally therefrom, lifting elements carried by said levers, a toggle connecting a cooperating pair of said levers, a nut carried by said toggle, and a screw journaled in said frame and cooperating with said nut to actuate said toggle and thereby move the lifting elements of said cooperating pairs of levers toward each other.

10. In a device of the character described, in combination, a frame, wheels supporting said frame, levers pivoted on said frame, lifting elements carried by said levers, tracks carried by said frame, rollers carried by said levers adjacent said lifting elements and engaging said tracks for supporting the levers therefrom, toggles connecting cooperating pairs of said levers, and means for simultaneously operating said toggles to move the lifting elements of said cooperating pairs toward each other.

11. In a device of the character described, in combination, a frame, wheels supporting said frame, levers pivoted on said frame and disposed to swing in substantially horizontal arcs, lifting elements carried by the outer arms of said levers clear of said frame, a screw rotatably mounted on said frame, nuts carried by said screw, a guide carried by said frame in sliding engagement with said nuts, and links connecting the inner ends of said levers with said nuts.

12. In a device of the character described, in combination, a frame, wheels supporting said frame, levers pivoted on said frame and disposed to swing in substantially horizontal arcs, lifting elements carried by the outer arms of said levers clear of said frame, a screw rotatably mounted on said frame, nuts carried by said screw, a guide carried by said frame in sliding engagement with said nuts, and links connecting the inner ends of said levers with said nuts, the ends of said screw being threaded in opposite directions, whereby rotation thereof in one direction will move cooperating pairs of said lifting elements toward each other.

13. In a device of the character described, in combination, a frame, wheels supporting said frame, levers pivoted on said frame, lifting elements carried by said levers, tracks carried by said frame, rollers carried by said levers adjacent said lifting elements and engaging said tracks for supporting the levers therefrom, a screw rotatably mounted on said frame, nuts carried by said screw, and links connecting the inner ends of said levers with said nuts, the ends of the screw being threaded in opposite directions, whereby rotation thereof in one direction will move cooperating pairs of said lifting elements toward each other.

In testimony whereof, I hereunto affix my signature.

ELKINS R. YOUNG.